United States Patent [19]

Nogami et al.

[11] 4,136,712
[45] Jan. 30, 1979

[54] SEALED RESERVOIR FOR BRAKE MASTER CYLINDER

[75] Inventors: Tomoyuki Nogami; Kaoru Tsubouchi, both of Toyota, Japan

[73] Assignees: Toyota Jidosha Kogyo Kabushiki Kaisha, Toyota; Aisin Seiki Kabushiki Kaisha, Kariya, both of Japan

[21] Appl. No.: 712,862

[22] Filed: Aug. 9, 1976

[30] Foreign Application Priority Data

Aug. 14, 1975 [JP] Japan .................................. 50-98865

[51] Int. Cl.² ...................... F16K 17/26; F16K 24/00; F16K 37/00

[52] U.S. Cl. ..................................... 137/558; 60/535; 60/545; 60/592; 137/493.8; 137/588; 220/209; 220/367; 340/59

[58] Field of Search ................. 60/534, 545, 585, 592, 60/586, 588, 535; 137/558, 493, 493.7, 493.8, 493.9, 588; 220/209, 367, 373, 374; 340/59

[56] References Cited

U.S. PATENT DOCUMENTS

| | | |
|---|---|---|
| 1,758,671 | 5/1930 | Loughead et al. .................... 60/586 |
| 2,622,762 | 12/1952 | Parsons ................................ 220/209 |
| 3,138,173 | 6/1964 | Hartman ............................ 137/493.8 |
| 3,302,658 | 2/1967 | De Frees ....................... 137/493.8 X |
| 3,421,606 | 1/1969 | Cadiou .............................. 137/493 X |
| 3,654,956 | 4/1972 | Tsubouchi ........................ 60/585 X |
| 3,831,801 | 8/1974 | Rodgers ........................... 137/493 X |
| 3,968,897 | 7/1976 | Rodgers ............................. 220/204 |
| 3,983,894 | 10/1976 | Sheppard ............................ 137/493 |

FOREIGN PATENT DOCUMENTS

| | | | |
|---|---|---|---|
| 2261762 | 6/1974 | Fed. Rep. of Germany ........... | 137/493 |
| 983085 | 2/1951 | France ........................................ | 60/588 |

*Primary Examiner*—Irwin C. Cohen
*Attorney, Agent, or Firm*—Stevens, Davis, Miller & Mosher

[57] ABSTRACT

In a sealed fluid reservoir for a hydraulic brake master cylinder, inlet and outlet check valves are compactly assembled with a reservoir cap to constantly seal brake fluid stored in the reservoir against the surrounding air. The inlet and outlet check valves are selectively opened in response to rise or drop of the level of fluid in the reservoir to ensure smooth fluid supply to the brake master cylinder.

8 Claims, 4 Drawing Figures

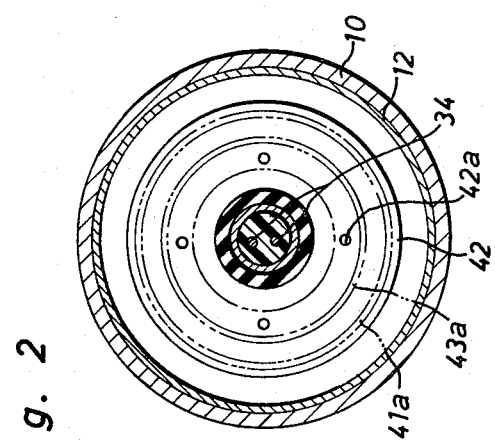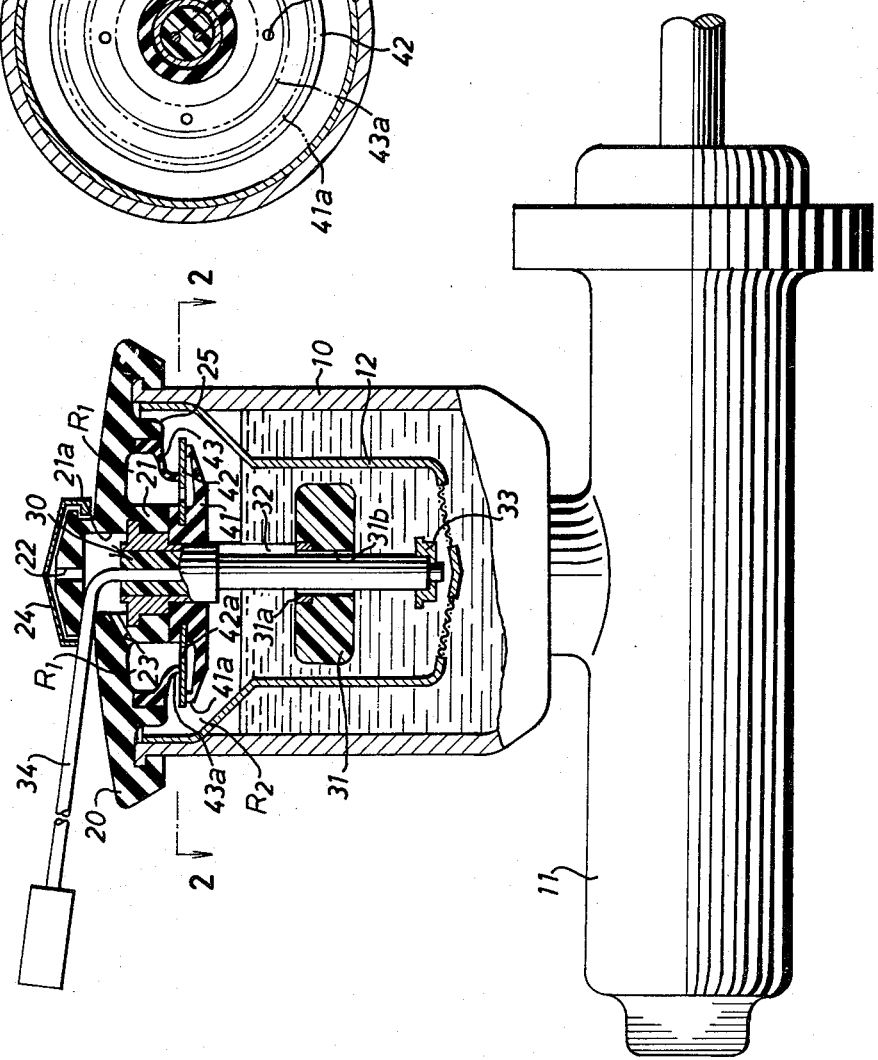

SEALED RESERVOIR FOR BRAKE MASTER CYLINDER

BACKGROUND OF THE INVENTION

The present invention relates to a fluid reservoir for a hydraulic brake master cylinder, and more particularly to an improvement of a sealed fluid reservoir in which brake fluid is constantly sealed against the surrounding air regardless of increase or decrease of the brake fluid.

In conventional sealed reservoirs of this kind, an extendable diaphragm seal member is fluid-tightly assembled with the opening of the reservoir casing to seal brake fluid stored within the casing against the surrounding air and to prevent entrance of water into the brake fluid. In adaptation of the diaphragm seal member, the fluid reservoir becomes large in size as the interior of the casing is occupied by the diaphragm seal member. Furthermore, in case the diaphragm seal member is designed in a thin film form to minimize the volume of the seal member so as to form the reservoir in a possible smaller size, the diaphragm seal member becomes less durable and high in production cost due to difficulty of fabrication of the seal member.

SUMMARY OF THE INVENTION

It is an object of the present invention to provide an improved sealed reservoir in which brake fluid stored in a reservoir casing is constantly sealed without reduction of the capacity of the casing.

Another object of the present invention is to provide an improved sealed reservoir wherein inlet and outlet check valves are compactly assembled with a reservoir cap to constantly seal brake fluid stored in the reservoir against the surrounding air and wherein the inlet and outlet check valves are selectively opened in response to rise or drop of the level of fluid in the reservoir to ensure smooth fluid supply to a brake master cylinder.

According to the present invention there is provided a fluid reservoir adapted for mounting on a brake master cylinder which comprises:

a casing for storing an amount of brake fluid;

a seal cap coupled with the upper opening of the casing to air-tightly seal the interior of the casing;

an inlet check valve assembled with the inner wall of the seal cap to permit only flow of the atmospheric air into an interior space formed above the surface of brake fluid within the casing;

an outlet check valve assembled with the inner wall of the seal cap to permit only flow of the internal air out from the interior space to the exterior; and means for communicating the interior space with the atmospheric air by way of the inlet and outlet check valves;

whereby brake fluid stored within the casing is air-tightly sealed by means of the inlet and outlet check valves.

In the preferred embodiment of the present invention, there is disclosed a fluid reservoir for a brake master cylinder which comprises:

a casing for storing an amount of brake fluid;

a seal cap coupled with the upper opening of the casing to air-tightly seal the interior of the casing;

a valve plate secured to the central inner wall of the seal cap and provided thereon with a plurality of openings disposed symmetrically on a circular path concentric with the center of the seal cap;

a first valve body made of elastic material in a mushroom configuration having a circular cap and a neck portion, the valve body being secured at the neck portion to the central inner wall of the seal cap coaxially with the valve plate and the annular rim of the cap portion being air-tightly engaged against the bottom face of the valve plate to close the valve openings;

a second valve body made of elastic material in an annular shape having an annular lip; the annular valve body being integrally provided on the inner wall of the seal cap concentrically with the first valve body and the annular lip being air-tightly engaged against the upper face of the valve plate to close the valve openings; and means for communicating an annular space formed inside the second valve body with the atmospheric air;

whereby brake fluid stored in the casing is air-tightly sealed by means of the first and second valve bodies engaged against both faces of the valve plate.

BRIEF DESCRIPTION OF THE DRAWINGS

The above-mentioned and further objects and features of the present invention will become clear from the following description with reference to the accompanying drawings, in which:

FIG. 1 is an elevational view partially in section showing a master cylinder with a sealed fluid reservoir in accordance with the present invention;

FIG. 2 is a cross-sectional view taken along line 2—2 of FIG. 1, showing a circular valve plate fixed to a main cap.

DESCRIPTION OF THE PREFERRED EMBODIMENTS

Figure 3:
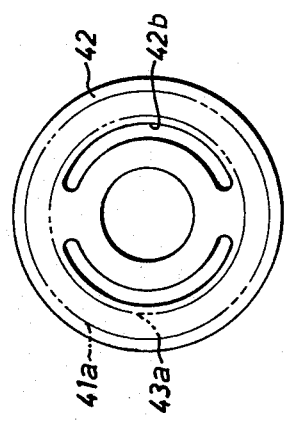
FIGS. 3 and 4 illustrate modifications of the circular valve plate shown in FIG. 2.

Referring now to the drawings, particularly in FIG. 1, a reservoir casing 10 is fixedly mounted on a brake master cylinder 11 to constantly store brake fluid therein as a supply for the master cylinder. Within the casing 10 a strainer 12 is assembled to filter contaminants which enter the casing 10. The upper opening of the casing 10 is fluid-tightly closed by a main cap 20 made of synthetic rubber. The main cap 20 is provided at its central inner wall with an annular boss 21 projecting toward the interior of the casing 10. On the head of the cap 20 a small vent hole 22 is provided to connect an inner bore 21a of the boss 21 to the atmospheric air and on the base of the boss 21 a passage 23 is provided to connect the inner bore 21a to the interior of the casing 10. Moreover, a metallic sub-cap 24 is loosely coupled on the head of the main cap 20 to cover the vent hole 22.

Within the interior of the casing 10, a magnetically operable switch means 30 comprises a rod element which is secured at its upper end to the annular boss 21 and extends downward through a float member 31 which is positioned to float on brake fluid stored within the casing 10. The rod element of the switch means 30 is provided therein with a normally open reed switch (not shown) which is connected to an electric alarming circuit by way of a lead wire 34 to issue a warning signal at a dangerous decrease in the quantity of the brake fluid. The float member 31 is arranged in the casing 10 for up and down movements in response to variations of the brake fluid level in the casing 10 and has a ring shaped permanent magnet 31a secured on the float 31. The upward movement of the float 31 is restricted by an upper stopper 31 provided on one side of the rod element of the switch means 30 and the downward movement of the float 31 is restricted by a lower stopper 33 fixed to the lower end of the rod element. Thus, the float 31 is retained by buoyancy in the upper position when brake fluid is stored adequately in the casing 10 and moves down in accordance with lowering of the level of fluid. When the level of fluid drops below a minimum, the float 31 engages the lower stopper 33 and the reed switch of the switch means 30 is closed by magnetic force of the permanent magnet 31a of the float 31 to energize the electric alarming circuit so as to warn the driver of a shortage of the brake fluid.

Hereinafter, a sealing construction adapted to the main cap 20 will be described in detail. The sealing construction is composed of a first valve body 41, a valve plate 42 and a second valve body 43, as shown in FIG. 1. The first valve body 41 is made of elastic material such as synthetic rubber in a mushroom configuration and is secured at its neck portion to the annular boss 21 of the main cap 20 so that the rod element of the switch means 30 is fluid-tightly surrounded by the seal member 41. The cap portion of the valve body 41 has a circular lip 41a to be air-tightly engaged with the valve plate 42. The valve plate 42 is a metallic circular plate which is rigidly secured at the central portion thereof to the neck portion of the first valve body 41. The metallic circular plate 42 is provided with a plurality of openings 42a disposed symmetrically on a circular path concentric with the axis of the first valve body 41, as shown in FIG. 2, to be normally closed by the circular lip 41a of the valve body 41. The second valve body 43 is also made of elastic material, such as synthetic rubber, in an annular shape and is secured to the inner periphery of an annular boss 25 which extends from the inner wall of the main cap 20. The valve body 43 includes an annular lip 43a to be air-tightly engaged with the metallic valve plate 42.

In the sealing construction mentioned above, the circular lip 41a of the first valve body 41 is resiliently engaged on the bottom face of the valve plate 42 to form an inlet check valve, while the annular lip 43a of the second valve body 43 is resiliently engaged on the upper face of the valve plate 42 to form an outlet check valve. Thus, the outlet check valve 43 closes an annular air chamber $R_1$ which is in open communication with the atmospheric air through the passage 23 and the vent hole 22 of the main cap 20, while a lower chamber $R_2$ in the casing 10 is air-tightly closed by the inlet and outlet valves 41a and 43a.

In use of the sealed fluid reservoir described above, when the surface of brake fluid in the casing 10 is maintained at a high level, the lower chamber $R_2$ is air-tightly closed by the inlet and outlet check valves 41a and 43a to be sealed against the upper air-chamber $R_1$. When the level of fluid in the casing 10 drops gradually due to shrinkage of the brake fluid caused by a fall of the ambient temperature or decrease of the brake fluid caused by abrasion of the brake linings, the pressure in lower chamber $R_2$ becomes negative in accordance with lowering of the fluid level. Then, the inlet check valve 41a opens by the pressure difference between the upper and lower chambers $R_1$ and $R_2$ so that the air in the upper air-chamber $R_1$ flows into the lower chamber $R_2$ through the inlet check valve 41a. The opening of the inlet check valve 41a is instantly completed and thereafter the lower fluid chamber $R_2$ is air-tightly closed by the inlet check valve 41a.

When the level of fluid in the casing 10 drops below a minimum by leakage of the brake fluid, the float member 31 moves down in response to lowering of the fluid level and the reed switch of the switch means 30 is closed by magnetic force of the permanent magnet 31a of the float to issue a warning signal. This energizes the electric alarming circuit to inform the driver of a shortage of the brake fluid.

Furthermore, if the level of fluid in the casing 10 rises due to inflation of the brake fluid and the air in the casing 10 caused by rise of the ambient temperature, the internal pressure of the lower chamber $R_2$ increases and the annular lip 43a of the second valve body 43 is flexed inward by the pressure difference in the upper and lower chambers $R_1$ and $R_2$. This opens the outlet check valve 43a to permit flow of the air from the lower fluid chamber $R_2$ into the upper air chamber $R_1$. The opening of the outlet check valve 43a is instantly completed and thereafter the lower fluid chamber $R_2$ is air-tightly closed again by the outlet check valve 43a.

As clearly described above, the present invention is characterized in that the valve plate 42 is secured to the central inner wall of the main cap 20, the mushroom shaped valve body 41 is secured to the central inner wall of the main cap 20 coaxially with the valve plate 42 to form the inlet valve 41a, thereby to permit only flow of the air into the lower fluid chamber $R_2$, and the annular valve body 43 is integrally provided on the inner wall of the main cap 20 concentrically with the mushroom valve body 41 to form the outlet check valve 41a thereby to permit only flow of the air out from the lower fluid chamber $R_2$. Thus, in a sealed fluid reservoir according to the present invention, brake fluid stored in the casing 10 is constantly sealed against the surrounding air by means of the inlet and outlet check valves which are selectively opened in accordance with a rise or drop of the brake fluid level to ensure smooth fluid supply to the master cylinder.

Figure 4:
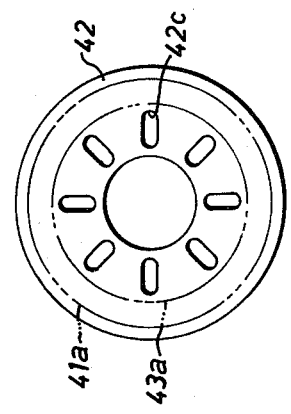

Further, in an actual application of the present invention, the second annular valve body 43 may be integrally formed with the inner wall of the main cap 20 and the openings 42a of the valve plate 42 may be replaced with a pair of arcuate holes 42b as shown in FIG. 3, or a plurality of radial slots 42c as shown in FIG. 4.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A fluid reservoir adapted for mounting on a brake master cylinder comprising:

a casing having an inner wall and an upper opening for storing an amount of brake fluid;

a resilient seal cap of an elastic material detachably coupled over the upper opening of said casing to air-tightly seal the interior of said casing, said seal cap defining an interior air space with the upper surface of brake fluid in said casing, said cap having at the center thereof a vent hole and an annular boss forming an inner bore opening to the vent hole;

a first annular valve body of elastic material fixedly mounted on said cap concentric with the center of said cap and spaced a predetermined distance radially inwardly from the inner wall of said casing;

a second valve body formed in a mushroom configuration and secured at its neck portion to said annular boss of said cap, said second valve body being made of elastic material and having a circular head portion opposed to said first valve body;

a valve plate having its inner edge carried by said annular boss of said seal cap between said first and second valve bodies, with the outer edge of said plate being spaced radially inwardly from the inner wall of said casing, said valve plate having at least one opening to permit the flow of air therethrough, said valve plate co-operating with said second valve body to provide an inlet check valve permitting the flow of air through said opening in said valve plate into said interior air space and further co-operating with said first valve body to provide an outlet check valve permitting the flow of air out from said interior air space to the exterior; and means for communicating the interior space to the atmospheric air by way of said inner bore in said annular boss and said inlet and outlet check valves.

2. A fluid reservoir as claimed in claim 1, wherein said valve plate is a circular plate having a plurality of openings disposed on a circular path concentric with the center of said seal cap.

3. A fluid reservoir as claimed in claim 1, wherein said valve plate is a circular plate having a pair of arcuate holes disposed on a circular path concentric with the center of said seal cap.

4. A fluid reservoir as claimed in claim 1, wherein said valve plate is a circular plate having a plurality of radial slots disposed on a circular path concentric with the center of said seal cap.

5. A fluid reservoir as claimed in claim 1, wherein said valve plate is a metallic circular plate having a plurality of openings disposed symmetrically on a circular path concentric with the center of said seal cap.

6. A fluid reservoir as claimed in claim 1, further comprising warning means including a rod element secured at its upper end to the center of said second valve body and extending into the brake fluid stored within said casing; a magnetically operable switch secured proximate to lower end of said rod element and connected to external warning means to issue a warning signal; a float member floatable in the brake fluid and arranged in the brake fluid in proximity to said rod element; a permanent magnet mounted on said float member to activate said switch when the level of brake fluid is lowered below a predetermined minimum level and said magnet approaches to within an operating distance from said switch; and stop means on said rod element arranged to restrict upward movement of said float in the brake fluid.

7. A fluid reservoir as claimed in claim 1, wherein said seal cap has a communication passage through said annular boss defining said communicating means to communicate the interior space to the atmospheric air by way of said inlet and outlet check valves.

8. A fluid reservoir as claimed in claim 1, wherein a metallic cap is loosely coupled over the head of said seal cap to cover said vent hole.

* * * * *